United States Patent [19]
Barr

[11] Patent Number: 5,711,670
[45] Date of Patent: Jan. 27, 1998

[54] MOTION-BASE RIDE SIMULATOR WITH IMPROVED PASSENGER LOADING AND UNLOADING METHOD AND APPARATUS

[76] Inventor: Craig Kevin Barr, 2925 Alta Terr., La Crescenta, Calif. 91214

[21] Appl. No.: 556,490

[22] Filed: Nov. 13, 1995

[51] Int. Cl.$^6$ .......................... G09B 9/08; G09B 19/16
[52] U.S. Cl. .................. 434/55; 434/58; 434/307 R; 472/60
[58] Field of Search .................. 434/29, 30, 33, 434/34, 38, 43, 44, 45, 55, 56, 57, 58, 59, 62, 69, 365; 463/1, 2, 6, 36, 37, 38, 40; 472/127, 130, 131, 135, 92, 60, 61, 136; 364/410, 411, 578; 348/36, 61, 121

[56] References Cited

U.S. PATENT DOCUMENTS

| | | | |
|---|---|---|---|
| 3,209,468 | 10/1965 | Frisch | 434/59 |
| 3,933,326 | 1/1976 | Schauffler | 434/30 X |
| 4,066,256 | 1/1978 | Trumbull | 434/59 X |
| 4,976,438 | 12/1990 | Tashiro et al. | 463/2 X |
| 5,052,932 | 10/1991 | Trani | 434/29 |
| 5,060,932 | 10/1991 | Yamaguchi | 434/58 X |
| 5,192,247 | 3/1993 | Barr et al. | |
| 5,199,875 | 4/1993 | Trumbull | 434/62 |
| 5,219,315 | 6/1993 | Fuller et al. | 434/58 X |
| 5,277,662 | 1/1994 | Fox et al. | |
| 5,299,964 | 4/1994 | Hopkins | |
| 5,353,074 | 10/1994 | Jones et al. | |
| 5,361,705 | 11/1994 | Powell | |
| 5,364,270 | 11/1994 | Aoyama et al. | |
| 5,433,670 | 7/1995 | Trumbull | |
| 5,490,784 | 2/1996 | Carmein | 434/55 |
| 5,527,184 | 6/1996 | Trumbull | 434/69 |

*Primary Examiner*—Joe Cheng
*Attorney, Agent, or Firm*—Oppenheimer Poms Smith

[57] ABSTRACT

A motion-base ride simulator includes a passenger cabin which is carried by a plurality of actuators within a limited operating envelope. During operation of the ride the movements of the passenger cabin simulate G-forces associated with an audio-visual presentation to the passengers within the cabin. The combination of sight, sound, and feeling (i.e., G-forces) provides the passengers of the ride with a sense of riding on a vehicle, such as a racing car or rocket ship. In order to facilitate one or both of passenger ingress and egress of the cabin, the motion base is so associated with a stationary passenger platform that the passenger cabin may be moved to a passenger access position immediately adjacent to but not touching an adjacent edge of this platform. In this passenger access position of the cabin passengers may enter into or leave from the passenger cabin without use of a movable passenger platform. An alternative embodiment of the invention has these same features, but also includes a singular movable passenger platform on a side of the passenger cabin other than the location of the stationary passenger platform and allowing through-flow of passengers during a passenger loading and unloading phase of ride operation. Another alternative embodiment of the invention allows passenger through flow.

24 Claims, 3 Drawing Sheets

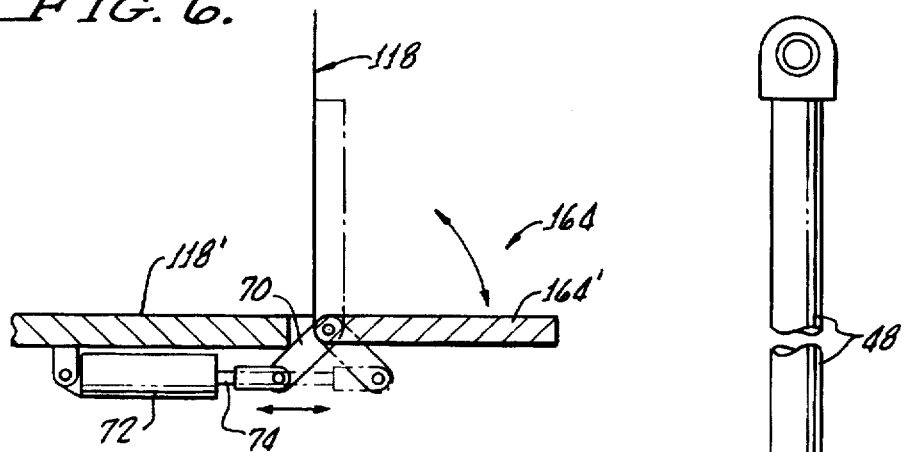
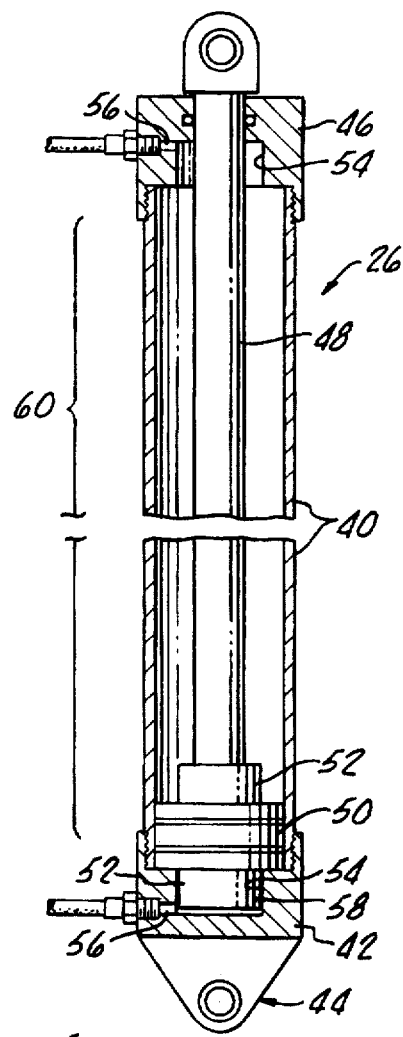
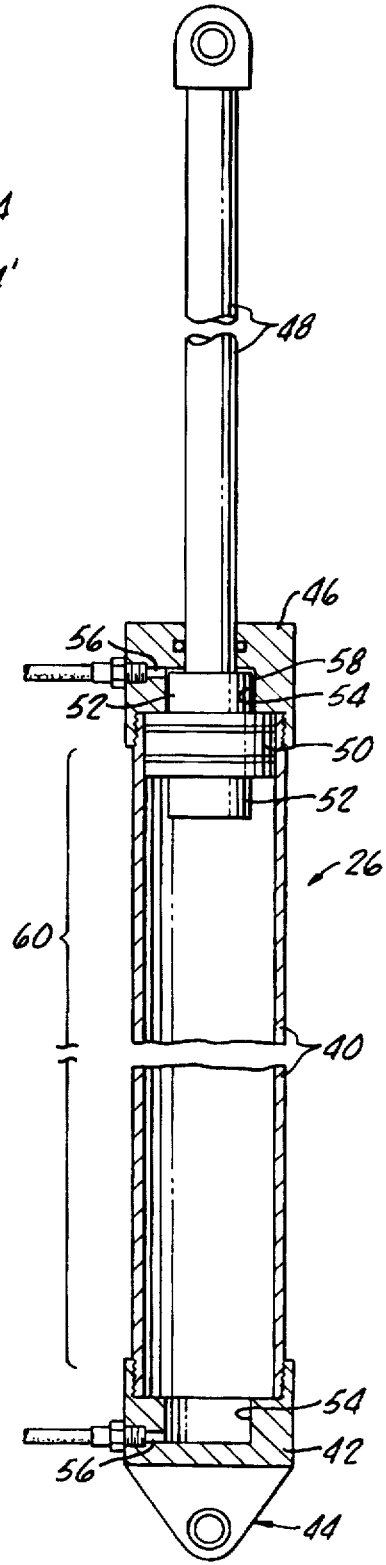

MOTION-BASE RIDE SIMULATOR WITH IMPROVED PASSENGER LOADING AND UNLOADING METHOD AND APPARATUS

BACKGROUND OF THE INVENTION

1. Field of the Invention

Generally, the present invention is in the field of amusement rides and vehicle ride simulators. More particularly, the present invention relates to a ride simulator which gives a passenger the impression of actually riding on a particular vehicle, or of having a particular dynamic experience of motion, through the use of a combination of stimuli. The combined stimuli are presented to the passenger through all of the senses of sight, sound, and touch. While within a passenger cabin of the ride, and while actually moving in only a limited or confined space on a six-degree motion base, the passenger experiences a simulated "ride" on a variety of vehicles, through the use of this invention. A passenger on this ride may "ride along" in a Grand Prix race car, a Grand Prix or Super Bike motorcycle, a drag race car, a power boat, a land speed record car, a World War II fighter aircraft, a modern jet fighter, a simulated time machine, or any number of other interesting and potentially dangerous vehicles in which most people will never have an opportunity to ride.

2. Related Technology

As a threshold consideration, it must be recognized that motion-base technology provides full six-degree-of-freedom motion bases, and less capable three-degree or four-degree motion-base mechanisms. The full six-degree motion-base mechanisms provide for accelerations (and movements) in all of the pitch, yaw, roll, sway (lateral), surge (fore-and-aft), and heave (vertical) directions. The less capable four-degree motion-base mechanisms will ordinarily omit one of the angular (i.e., pitch, yaw, and roll) and one of the linear (i.e., sway, surge, and heave) motions. The realism which can be provided to a passenger on a motion-base ride is considerably decreased with anything less than a full six-degree motion-base.

An example of a motion-base type of ride simulator is found at Disneyland in Anaheim, Calif, and is known as the STAR TOURS attraction. This ride provides passengers within an enclosed passenger cabin with the simulated experience of riding in an interplanetary space ship during a trip to distant planets. Along the way, passengers participate in an attack on a hostile space ship. Of course, the cabin of this ride moves only a short distance on a motion base while the passengers are provided with an audio-visual presentation simulating the space ship ride. While this audio-visual presentation is under way, correlated G-forces are provided to the passengers by motions and accelerations of the motion base carrying the passenger cabin.

Flight simulators and automobile driving simulators have been in existence for many years. In their rudimentary form, these simulators provide a movie or video tape of the view through an aircraft or automobile windshield so that the "pilot" or "driver" in the simulator can respond to the events viewed as they are presented to the viewer. For example, automobile driving simulators of this type have long been used for driver training. In the use of these driver training simulators, the trainee sits at a console or table equipped with a steering wheel, gas pedal, and brake pedal, which together simulate the controls of an automobile. The trainee views the movie on a screen or sees a video presentation on a television monitor. As the movie or video presentation takes place, the trainee is presented with a variety of driving situations, to which the trainee is to respond with appropriate inputs to the simulated automobile controls.

In the conventional driver training simulator, these simulated controls are connected to an instructor's monitoring instrument so that students may be scored on their performance, and those who do not make the appropriate control inputs may be identified and further instructed. Understandably, this rudimentary driver training simulator does not have a high degree of realism. The realism of unpredictability is lost in this simulator. Once a student has experienced one training session, that same training movie or video will be familiar, and the student's driving responses will be conditioned by experience rather than being the spontaneous responses of the student to unexpected situations. For this reason, a variety of movies or videos need to be provided for use with this type of simulator. The rudimentary flight simulators operate similarly to driver training simulators.

Still more advanced flight simulators add a motion base on which the trainee or passenger is carried and moved in an enclosed cabin in order to experience the sights, sounds and simulated acceleration forces (herein, "G-forces") correlated with the apparent motions of the simulated aircraft on the ground or in flight. Such motion-base ride simulators move only a few inches or feet, and have a limited range of G-forces which may be provided to the passenger in the simulator. These G-forces are provided by a combination of horizontal and vertical accelerations, (resulting in limited horizontal and vertical motions of the cabin), combined with rotational accelerations of the cabin (resulting in angulation or tipping of the cabin through limited angles) so that a portion of the gravitational force can be added to the G-forces generated by some cabin motions.

Between sensory movements of the passenger cabin which do provide a sense of acceleration to the occupants of the passenger cabin, the cabin of such a motion-base ride simulator is smoothly moved at a sub-perceptual rate toward a centered position in anticipation of the next sensory movement. That is, the cabin of the simulator actually has only a limited range of motion so that between sensory accelerations the motion base has to creep the cabin back toward its centered position. In this way, with the motion base creeping the cabin back toward its centered position at a sub-perceptual rate between sensory motions, as much as possible of the movement of the motion base is available for the next sensory movements of the passenger cabin.

Motion-base ride simulators of the type represented by STAR TOURS use a passenger cabin provided with many passenger seats arranged in rows across the cabin, and with plural doors at each side of the cabin. These doors are arranged in opposed pairs aligned with each row of seats for simultaneous through-flow passenger ingress and egress. During passenger loading and unloading, at least a pair of movable passenger loading and unloading platforms are required to bridge the gaps on each side of the cabin between stationary passenger platforms and walkways and the area within which the passenger cabin moves while the ride is in operation. However, these movable passenger platforms represent a significant additional complexity for the ride. That is, these movable passenger platforms must either retract, slide, fold, move vertically, or otherwise be taken out of the maximum-excursion envelope of the ride so that the cabin can move about during operation of the ride without hitting the movable passenger platforms.

Early motion-base flight simulators used a movable stairway which was manually moved into position to allow access of trainees to and from the cabin of the flight simulator. More recently, motion-base amusement rides such as STAR TOURS conventionally employ movable passenger platforms which are carried by an elevator or draw bridge mechanization, which elevates or folds these movable passenger loading and unloading platforms away from the cabin during operation of the ride. Thus, for passenger loading and unloading, the movable passenger platforms are lowered essentially like the car of an elevator or like a drawbridge on each side of the passenger cabin to a level aligning with the floor of the cabin and with the stationary passenger platforms.

It can easily be understood that conventional movable passenger platforms, what ever their design and actuation, and what ever their mechanization for raising and lowering these platforms if they are the elevator or draw bridge type (or for otherwise moving them out of the way of the motion base and cabin to allow operation of the ride followed by their return to a position permitting the passengers to embark and disembark from the ride), all are complex and expensive. There is a great need to eliminate these movable passenger platforms used by motion-base ride simulators for allowing passenger ingress and egress.

Also, these movable passenger platforms must interface closely enough with the stationary platforms, and with the passenger cabin, that there is virtually no risk of a passenger falling through the gap between these structures. In fact, the interface of these movable platforms must be such that a passenger cannot insert a hand, foot, finger, or any other body part into any exposed gap left between the movable platforms and either the stationary platforms, or the cabin of the ride. Understandably, this passenger safety requirement necessitates a careful design and a high degree of precision and reliability in the construction and operation of motion-base ride simulators using conventional movable platforms. Additionally, these movable passenger platforms all add additional maintenance requirements to the ride, and can nevertheless cause lack of reliability for the ride if they malfunction.

Another conventional vehicle ride simulator used for amusement is similar to the STAR TOURS ride in that it relies on an enclosed passenger cabin carried on a motion base, and within which passengers sit to receive an audio-visual presentation. In this case, the motion base is believed to be the less capable four-degree type. However, this ride simulator uses a visual presentation similar to the early flight simulators or driver training simulators, in that it is recorded by a camera looking forward through the windshield of an actual vehicle of the type being simulated. An audio presentation also recorded in the actual vehicle is used along with this visual presentation to the passengers in the simulator. Thus, this simulator has true correlation of the audio-visual presentation, and a good level of realism in this limited respect. For example, passengers in this conventional ride simulator may see the view through the windshield and hear the sounds of the actual vehicle, such as a NASCAR stock car on the track at Daytona Beach, Fla., for example, while also experiencing simulated G-forces.

However, for passenger loading and unloading with this ride simulator, the motion base is lowered on its actuators to a centered rest position adjacent to the floor upon which its base rests. Passengers simply walk across this floor and step up into the cabin using one or more steps carried with the cabin. The cabin of this ride is able to carry one or more steps which allow this access for passengers because the movements of this motion base mechanism are sufficiently short that the step or steps cannot contact the floor upon which the motion base mechanism sets, even with full motion of the motion base in a direction moving this step (or steps) toward the floor. With motion bases having a greater range of motion, this type of passenger loading and unloading will not suffice because the motion base has sufficient motion that the steps would strike against the floor.

Yet another contemporary motion-base ride simulator, which is configured as a motion-base theater, is found in the BACK TO THE FUTURE ride at Universal Studios in North Hollywood, Calif. In this ride the passenger cabins take the form of simulated time machine cars, and the passengers load into these cars from a platform simulating the ground level or pavement upon which the cars initially appear to be sitting. In contrast to the enclosed passenger cabins of the STAR TOURS ride, the cars of this more recent ride are not enclosed, and the occupants of the ride view the visual part of an audio-visual presentation on a large movie theater type of screen.

In order to move the cars from their loading positions to the theater environment, under each car of the BACK TO THE FUTURE ride is located a scissor-jack type elevator. This elevator raises the car from its loading level vertically up into the theater. Between each car and its jack is a motion-base mechanism. Upon completion of the ride, the car is returned to its "ground" level and the passengers depart the car onto the platform and leave the ride. With this ride, the scissor-type elevator necessary for each ride platform (i.e., the simulated time machine cars) represent a considerable investment in construction and operation expenses for the ride. Also, these elevators require considerable maintenance and can cause a loss of reliability of the ride if they malfunction.

Conventional technology which may be considered to be relevant to the present invention is found in one or more of the following United States patents:

U.S. Pat. No. 5,192,247, issued 9 Mar. 1993 to Craig K. Barr and Peter N. Alexander, the former who is also the inventor of the present invention, relates to a amusement attraction in which a stationary screen is disposed in front of a stationary projector. The audience for an audio-visual presentation including use of the screen and projector is carried on a motion-base platform, possibly including a simulated vehicle in which the passengers ride. Each one of several motion-base platforms or simulated vehicles is provided with a scissors type elevator moving the audience on that elevator from a staging (loading and unloading) room into a viewing position in the theater. Once in the viewing position, the audience may see substantially the entire screen but cannot see audience members in other simulated vehicles, while the audio-visual presentation proceeds in concert with G-forces provided by the motion bases.

U. S. Pat. No. 5,277,662, issued 11 Jan. 1994 to Richard J. Fox, et al., is believed to relate to a system for passenger ingress and egress in an amusement ride provided with a passenger cabin carried on a motion base. In this invention, the passengers are allowed to walk between stationary passenger platforms and the cabin of the ride across movable bridges. Before operation of the motion base, the movable bridges either elevate vertically on a guide rail mechanism or pivot upwardly at an axis adjacent to the stationary passenger platform so that the bridges are outside of the maximum-excursion envelope of the cabin. After ride operation, the cabin is moved to a selected position, and the movable bridges are returned to their former positions to allow passenger ingress and egress.

U. S. Pat. No. 5,282,772, issued 1 Feb. 1994 to Shozo Ninomiya, et al, appears to relate to a ride simulator for giving passengers a simulated ride down a river rapids. The ride simulator includes a theater upon which a visual presentation is projected, along with water splash, river sounds, and wind. The "boat" in which passengers ride is swayed and tilted by a mechanism (which is similar to a motion-base mechanism) under the a water channel carrying the boat so that riders have the simulated experience of shooting down a river rapids. Acceleration forces from an actual boat on an actual river rapids is apparently not used in this simulation. This simulation would again appear to rely for its realism upon the skills of a technician to provide and time G-forces to the audio-visual presentation.

U.S. Pat. No. 5,316,480, issued 31 May 1994 to Thayne N. Ellsworth is believed to disclose a multi-media (sight, sound, and motion) ride simulator with a passenger cabin moved by actuators while a audio-visual presentation is made to the passengers. The ride includes a real-time video presentation of familiar surroundings during an initial and concluding parts of the ride so that passengers have the impression of leaving the local of the ride on a moving vehicle, and later of returning to this same spot on the vehicle after a trip into space. Of course, the ride does not actually leave the local during the simulated trip.

U.S. Pat. No. 5,361,705, issued 8 Nov. 1994 to Tyrone E. Powell appears to disclose a simulated interactive drag strip amusement ride. This amusement ride is believed to employ a vehicle actually moving on a track, and to not employ a motion base to simulate such movement.

U.S. Pat. No. 5,364,270, issued 15 Nov. 1994 to Akihiro Aoyama, et al., appears to relate to a motion-base ride simulator, but does not appear to relate to passenger loading or unloading from the passenger cabin of the ride.

U.S. Pat. No. 5,433,670, issued 18 Jul. 1995 to Douglas Trumbull, seems to relate to a motion-base theater of reduced height which relies only on linear motions along three orthogonal axes to create the impressions of G-forces associated with apparent motions in an audio-visual presentation. That is, the '670 patent does not use angular motions in the pitch, roll, and yaw axes to create the sensed G-forces. This ride simulator would appear to be somewhat lacking in its ability to create a sense of realism for the simulated vehicle ride.

In view of the above, it is apparent that there is a great need for a motion-base ride simulator which can be used for amusement rides, as well as for training and other purposes, which allows passenger loading and unloading without the use of expensive expedients, such as movable passenger loading or unloading platforms, or such as jacks to elevate the passenger cabin of the ride from a loading area into a motion-base theater.

SUMMARY OF THE INVENTION

In view of the deficiencies of the conventional technology, a primary object for this invention is to overcome one or more of these deficiencies.

An additional object for this invention is to provide a six-degree motion-base ride simulator in which a movable passenger loading or unloading platform is not necessary.

Additionally, it is an object for this invention to provide a six-degree motion-base ride simulator of the type described above, in which passenger loading and unloading is accomplished by providing a stationary passenger platform disposed slightly outside of the normal range of motion for the passenger cabin and motion-base of the ride simulator, which normal range of motion is used during ride simulation, and in which the passenger cabin is moved by the motion-base outside of this normal range of motion to a passenger loading/unloading position adjacent at one side of the cabin in selected alignment with the stationary passenger platform.

Accordingly, the present invention in accord with one aspect thereof provides a six-degree motion-base ride-simulator theater comprising: a passenger cabin including at least one means for occupancy of this cabin by a human passenger establishing a forward direction for the passenger cabin, and a portal at a side of the cabin for allowing ingress and egress of the passenger; means for providing an audio-visual presentation to the passenger; a six-degree movable motion base carrying the passenger cabin; the motion base including plural actuators providing motion to the passenger cabin; during ride simulation the motion base moving the passenger cabin within an operating envelope to provide G-forces to the passenger in concert with the audio-visual presentation; and mechanical motion stops associated with the plural actuators limiting motion of the actuators and cooperatively defining a maximum-mechanical-excursion envelope for motion of the cabin, which maximum-mechanical-excursion envelope is outside of the operating envelope; a stationary passenger platform disposed outside of but closely adjacent to the maximum-mechanical-excursion envelope adjacent to the side of the cabin; the stationary passenger platform providing for passenger ingress and egress from the cabin via the portal; and a ride controller including means for driving selected ones of the actuators against the mechanical motion stops to position the cabin in a passenger loading/unloading position adjacent to but not touching the stationary passenger platform to allow passenger ingress and egress.

According to another aspect, the present invention provides a method for passenger loading and unloading from a passenger cabin of a six-degree motion-base ride simulator, the method including steps of: providing a passenger cabin including means for receiving and occupancy by at least one passenger and establishing a forward direction for the passenger cabin; providing a portal at a side of the passenger cabin for allowing passenger ingress and egress; providing a six-degree movable motion base carrying the passenger cabin; including in the motion base plural actuators providing motion to the passenger cabin; using the actuators to move the passenger cabin within an operating envelope to provide G-forces to the passenger; and providing the plural actuators with mechanical motion stops limiting motion of the actuators to cooperatively define outside of the operating envelope a maximum-mechanical-excursion envelope for motion of the passenger cabin; providing a stationary passenger platform disposed outside of but closely adjacent to the maximum-mechanical-excursion envelope and adjacent to the side of the cabin; thereby providing for passenger ingress and egress from the ride simulator via the stationary passenger platform; driving selected ones of the plural actuators against the mechanical motion stops to position the passenger cabin in a passenger loading/unloading position at a selected position of the maximum-mechanical-excursion envelope toward the side of the passenger cabin and adjacent to but not touching the stationary passenger platform; and allowing passenger ingress and egress between the passenger cabin and the stationary passenger platform while the passenger cabin is in the loading/unloading position.

An advantage of the present invention results from its eliminating the conventional movable passenger loading and unloading platforms which are required by conventional motion-base ride simulators. Accordingly, the maintenance requirements for the ride simulator are decreased, while safety and reliability of the ride are increased.

BRIEF DESCRIPTION OF THE DRAWING FIGURES

FIG. 1 is a schematic pictorial presentation of a six-degree motion-base ride simulator in the form of a motion-base theater embodying the principles of the present invention;

FIG. 2 provides a plan view of one passenger cabin of the theater seen in FIG. 1;

FIGS. 4 and 5 are respective fragmentary cross sectional views of correspondingly numbered encircled portions of FIG. 3; and FIG. 6 provides a fragmentary view partially in cross section of an alternative embodiment of the invention.

DETAILED DESCRIPTION OF TWO EXEMPLARY PREFERRED EMBODIMENTS OF THE INVENTION

Figure 1:
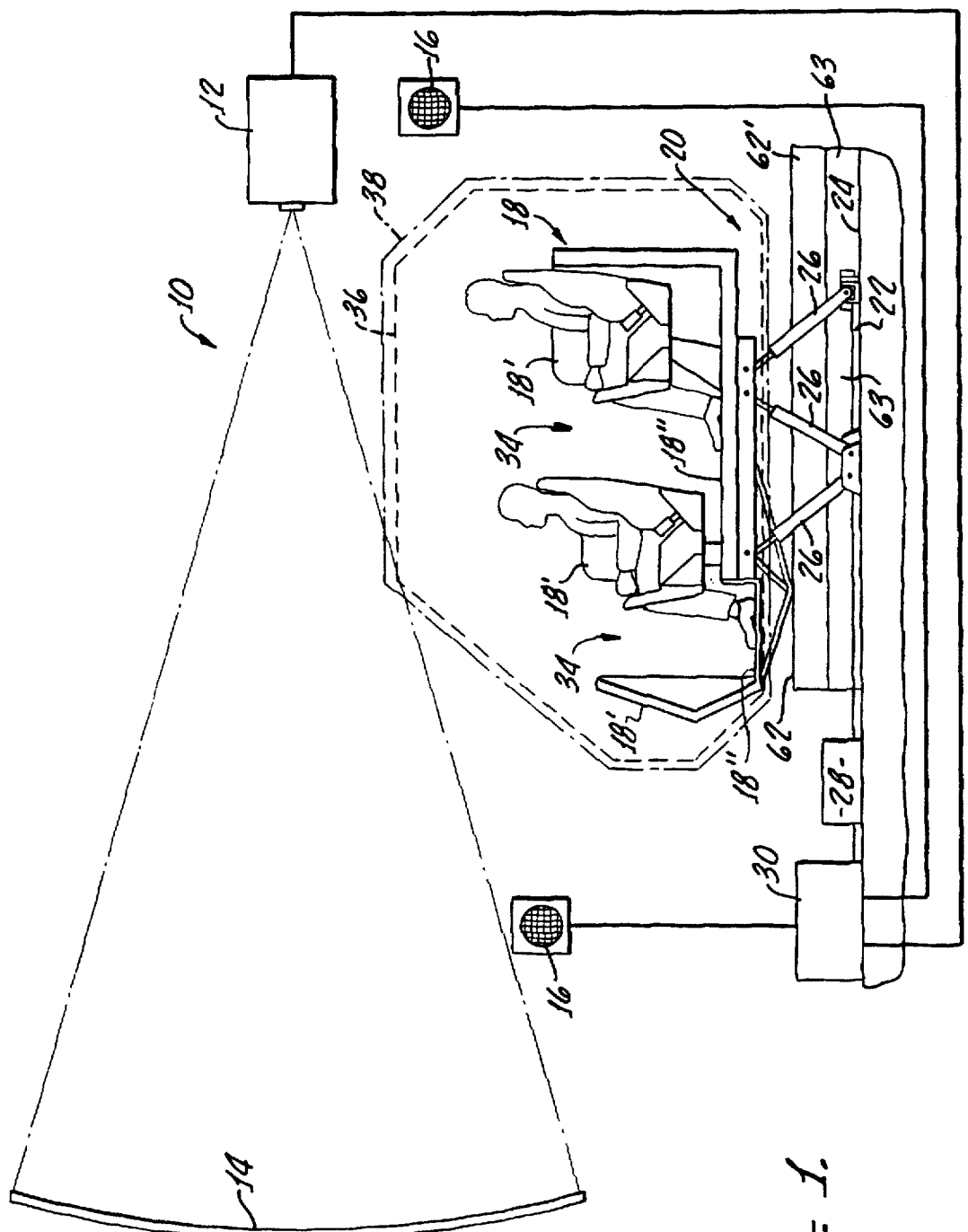
Figure 2:
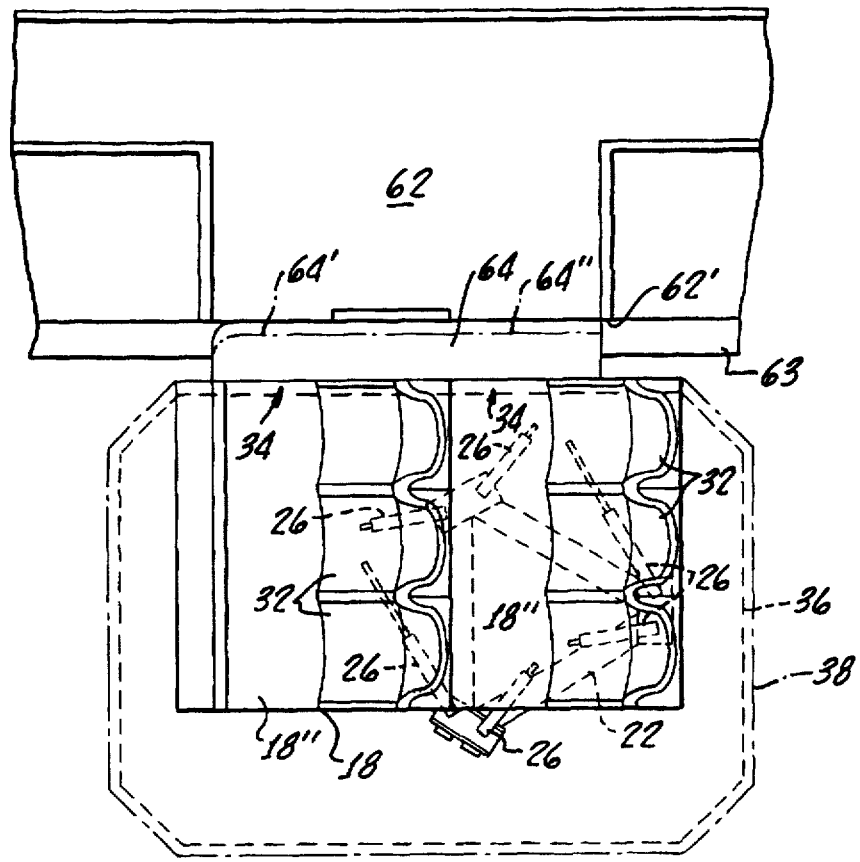
Figure 3:
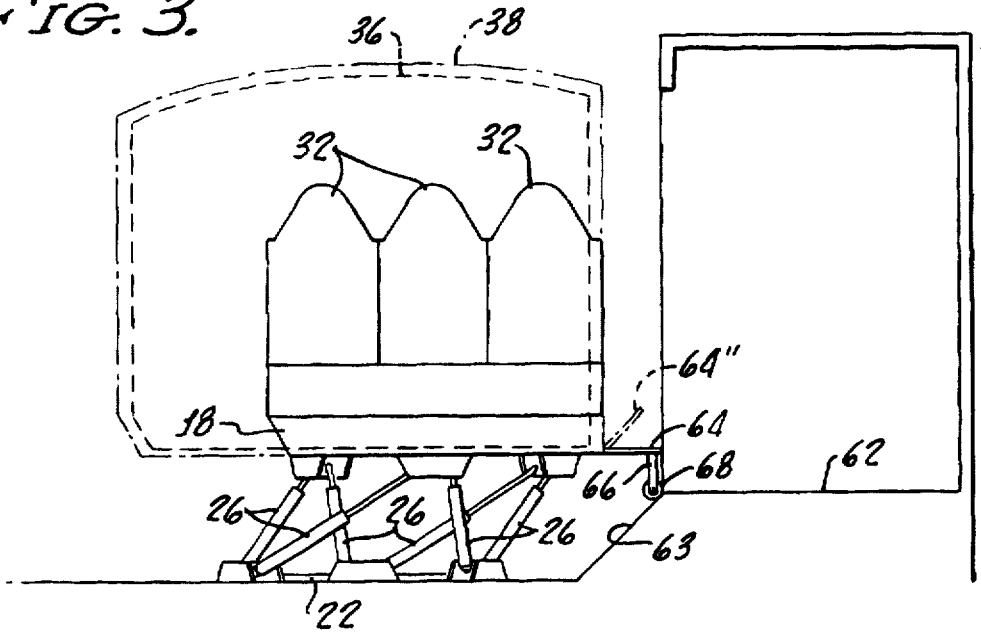
FIG. 3 is an end elevation view of the one passenger cabin seen in FIG. 2, and depicts the passenger cabin moved outside of an operating envelope for the motion base to a maximum-mechanical-excursion position adjacent to a passenger platform for passenger loading and unloading.

Viewing FIGS. 1–3 in conjunction, an exemplary six-degree motion-base ride simulator embodying the present invention is schematically illustrated in the form of a motion-base theater, and is generally referenced with the numeral 10. Those ordinarily skilled in the pertinent arts will recognize that the motion-base ride-simulator theater 10 will ordinarily be housed within a theater building, not shown. However, the theater 10 includes a projector 12 and a screen 14 for presenting the visual portion of an audio-visual presentation. The projector 12 may be a movie projector, or a television type of projector (including CRT and liquid crystal projectors) which provide an image in response to electrical image signals. For example, the projector 12 may provide an image on screen 14 in response to electrical image signals from a video cassette player or from a computer graphics generator, or from a combination of sources simultaneously. The theater 10 is also equipped with speakers 16 for providing the audio portion of the multi-media audio-visual/G-force presentation.

In order to provide the G-force portion of the multi-media presentation, the theater 10 includes an open passenger platform or cabin 18 carried on a motion-base mechanism 20. This cabin 18 includes a body (referenced with the numeral 18'), which body has a floor (referenced with the numeral 18"). In considering the following description, it should be kept in mind (those ordinarily skilled in the pertinent arts would make this recognition without explanation), that a motion-base ride simulator embodying the present invention may also take the form of an amusement ride with an enclosed passenger cabin like the STAR TOURS ride, rather than of the open-cabin theater-type of ride simulator as illustrated. Also, it will be understood that when the word "cabin" is used in this description in connection with the platform or cabin 18, this reference is generic to the passenger-carrying structure of the ride simulator, and is not a limitation to either an open passenger platform, to an open passenger car as depicted, or to an enclosed passenger cabin structure, as described above.

The motion-base mechanism 20 includes a base 22 secured to a floor 24 of the theater 10. As is conventional, the motion-base mechanism 20 includes a plurality (six in this case) of elongate actuators 26 pivotally supported by the base 22, and pivotally supporting the cabin 18. As is usually the case, the actuators 26 are elongate hydraulic cylinders powered by a hydraulic pumping and control valve system 28. The pumping and control valve system is controlled by a ride controller 30, which also provides the inputs to the projector 12 and speakers 16 so that the multimedia events (i.e., visual presentation, audio presentation, and G-forces) are synchronized with one another.

The passenger cabin 18 is provided with passenger seats 32 arranged in rows across the cabin. As depicted, the floor 18" of the cabin may be stepped to provide differing elevations for the seats 32. Thus, passengers seated behind other passengers are provided with a better view of the screen 14. Preferably, the elevation difference between various levels of the floor 18" conforms to the standard 7" building step dimension, as will be further explained.

In conjunction with these seats 32, the cabin 18 will ordinarily include a safety restraint device for the passengers. For example, the cabin 18 may include conventional seat belts (as shown), safety harnesses (not shown), or draw-down locking safety bars (not shown). Alternatively, this safety restraint device will conventionally also include either a remote unlocking control to insure that the restraint will unlock only in preparation to passenger unloading, or a safety stop interlock for the ride itself. In the first alternative, the restraint device insures that passengers can not be thrown from the ride during operation, and the remote unlocking control insures that the passengers cannot depart of their own volition from the ride at an inappropriate time during its operation. The other and more desirable alternative also prevents passengers from being thrown from the ride, but allows their departure at any time, as during an emergency. With this alternative, should a passenger need to depart the ride during operation, unlocking of the safety restraint by the passenger immediately stops the ride and freezes it in position. Thus, passengers can safely depart from the ride if they need to do so.

Accordingly, it will be understood that the passenger cabin 18 includes features allowing occupancy of this cabin by human passengers, and for retention of these passengers on the ride during its operation. It will be further understood that the passengers do not necessarily have to sit on the passenger cabin 18 within the scope of the present invention. For example, if the ride 10 were used to simulate a down hill ski run, then the passengers would be standing on simulated skis (not shown) upon an open platform configuration of support for the passengers atop motion base 20. These passengers would then be supported against being thrown from the ride, for example, by an individual support column (not shown) for each passenger. Such a support column would include its own safety belt with remote unlocking control or interlock safety stop.

Returning to a consideration of the cabin 18, it is seen that aligned with each row of seats 32 is a respective passenger loading and unloading portal, generally referenced with the arrowed numeral 34, which portal may take the form of a door way (with or without a door), or of simply a step-through formed in the body 18' of the cabin 18. The portal 34 can also take the form of a gateway or opening (with or without a gate) in a railing around a generally open-platform configuration of passenger cabin supporting the passenger seats 32 on the motion base 20 (generally as illustrated). As illustrated, the portals 34 open outwardly of the cabin at the respective levels of the floor 18" for the row of seats 32 served by each portal. Again, the elevation difference between rows of seats 32 and portals 34 preferably corresponds to the standard 7" building step dimension.

During operation of the motion-base ride-simulator theater 10, the passengers are seated in seats 32, and receive an audio-visual presentation, the video portion of which is presented on screen 14, and the audio portion of which is provided by the speakers 16, both under control of the ride controller 30. The G-force portion of the presentation is provided by accelerations and motions of the cabin 18 effected by the actuators 26 under control of the pump and control valve system 28 and ride controller 30. Consequently, while the audio-visual presentation is in progress, the passengers are exposed to correlated and synchronized G-forces caused by movements of the passenger cabin by actuators 26 within a three-dimensional operating envelope 36. As will be seen, the operating envelope 36 is defined by the normal range of motions possible for the actuators 26 without driving these actuators against physical stops associated with these actuators. The physical stops may be either internal or external to the actuators 26. However, the depicted embodiment provides these physical stops internally of the actuators, as will be seen. Further, it will be seen that the actuators 26 have a range of motion slightly greater than that operating range of motion used in operation of the motion base, and defining the operating envelope 36.

It can easily be appreciated that during ride-simulation operation of the motion base 20, the actuators 26 are not driven against the physical stops because doing so would generate an impact force. Such an impact force could possibly damaging the motion-base mechanism, and would certainly disturb or frighten the passengers on the ride. Accordingly, all of the G-forces and motions used during ride-simulation operation of the motion base 20 are selected and limited to retain a safety margin of unused motion in the actuators 26. The aggregate positions of the cabin 18 using these normal ranges of motion for the actuators 26 defines the operating envelope 36. However, slightly outside of the operating envelope 36 is a three-dimensional maximum-mechanical-excursion envelope 38 for the cabin 18. This maximum-mechanical-excursion envelope is defined by the extremes of possible motions for the cabin 18 with certain ones of the actuators 26 driven against their physical stops. For safety reasons, all physical structures such as passenger loading platforms and walkways must be kept outside of this maximum-mechanical-excursion envelope 38 while the ride is in operation.

Viewing now FIGS. 4 and 5 in conjunction, it is seen that the actuators 26 typically include an outer cylinder portion 40, a closed cylinder head 42 pivotally attached and supported by the base 22 via a structure indicated with the arrow 44, and an annular cylinder head and seal gland 46. A piston rod 48 slidably and sealingly passes through the cylinder head and seal gland 46. This piston rod pivotally secures to and supports the cabin 18. Within the cylinder portion 40, the piston rod 48 is moved axially by a piston head 50 acted upon by opposing hydraulic fluid pressures. This piston head 50 includes a pair of oppositely extending reduced-diameter sections 52. At each of the cylinder heads 42 and 46, a reduced diameter counter bore feature 54 is defined. The sections 52 are receivable closely into the counter bore features 54, and the hydraulic fluid ports 56 for the actuators 26 communicate with the counter bores 54. Consequently, a hydraulic cushion feature is formed at each end of the actuators 26 by trapped fluid between the piston head 50 and a respective one of the cylinder heads 42 and 46. This trapped fluid must escape through a small annular gap 58 defined between the reduced-diameter section 52 and the respective feature 54 of the associated cylinder head 42 or 46 before the piston head 50 can contact the respective cylinder head.

When the piston head 50 does contact one of the cylinder heads 42 or 46, a physical limit or stop for the movements of the actuator 26 has been reached. Accordingly, it is seen that the maximum-mechanical-excursion envelope 38 for the cabin 18 is defined by the positions of the cabin with the actuators fully extended or fully contracted against these physical stops. This hydraulic cushion structure is conventional in hydraulic actuators and prevents a sudden hard impact of the piston head 50 against the cylinder heads 42 and 46. Because of the presence of the hydraulic cushion structures, the operating envelope 36 uses only a central operating-stroke portion 60 of the possible movement of the piston head 50, so that the piston head portions 52 do not enter the counter bores 54 during movements of the actuator within this operating-stroke portion of movement. The movements of the cabin 18 with actuators 26 operating within their operating stroke portions 60 defines the operating envelope 36.

In order to allow passenger loading and unloading from the cabin 18 (returning to a consideration of FIGS. 2 and 3), the present invention provides a stationary passenger platform 62 at the side of the cabin 18. The closest edge 62' of the platform 62 is located closely adjacent to but slightly outside of the maximum-mechanical-excursion envelope 38 parallel along side of the cabin 18 and is aligned with the rows of seats 32 and portals 34. This stationary passenger platform 62 includes a chamfered transition surface 63 extending from the edge 62' toward the motion base 20, and the purpose of which will be further explained.

As is seen in FIGS. 2 and 3, during operation of the motion-base ride-simulator theater 10, the cabin 18 may move around in operating envelope 36 with a generous margin of safety between the cabin 18 and the platform 62. As the maximum-mechanical-excursion envelope 38 depicts, even if the pump and control valve system, ride controller 30, or any other part of the control system for the ride 10 were to malfunction, the passenger cabin 18 cannot strike the edge 62' or any other part of platform 62 because of the physical stops associated with the actuators 26. The cabin 18 cannot physically reach the platform 62 so as to strike against any part of this platform.

However, when it is desired to allow passengers to ingress or egress the cabin 18 to or from the platform 62, the ride controller 30 can fully extend some of the actuators 26 while fully contracting other of the actuators, moving the cabin 18 to a position of alignment with the platform 62. This position of alignment of the cabin 18 with the platform 62 is shown in solid lines in each of FIGS. 2 and 3. All of the actuators 26 are driven against one of their physical stops, and are held rigidly in this position by hydraulic fluid pressure applied via the ports 56. Consequently, the cabin provides a satisfactory degree of stability in its loading/unloading position. Also, the lengths of the actuators 26 are selected such that the cabin 18 in this loading/unloading position is level for passenger ingress and egress.

Movement of the actuators 26 from positions within their operating-stroke portions of movement, through the hydraulic cushion portion of their movement, and to the physically stopped positions illustrated in FIGS. 3, 4, and 5, is necessarily rather slow (recalling the necessary escape of trapped fluid adjacent to the cylinder heads 42 and 46 via the gaps 58. During this movement toward the platform 62, the controller 30 may also supply a reduced level of hydraulic pressure to the actuators 26 driving them toward the passenger loading and unloading position of FIG. 3. However, this slow-approach movement of the passenger cabin toward the platform 62 is more controlled and more comfortable for the passengers. Once the actuators 26 do reach their mechanical motion stops, full hydraulic pressure may be applied to keep them in this position, assuring a high degree of rigidity of the cabin 18 while passengers are unloading from and loading into this cabin.

In the depicted position for passenger loading and unloading as seen in FIG. 3, the cabin 18 is level, parallel and adjacent to the edge 62' of the platform 62; and for passengers in the first row of seats 32, is at a level such that their floor 18" is a standard building-step distance above the platform 62. As is seen in FIGS. 2 and 3, the cabin carries a two-part hinged cantilevered step structure 64. This step structure includes a forward portion (indicated with numeral 64'), and a rear portion (indicated with numeral 64"). The forward portion 64', and the rear portion 64" of the step structure 64 are each independently pivotal upwardly as an important safety feature of the invention, as will be seen.

This step structure 64 at its upper surface is level with the floor 18" for the first row of passenger, and is a standard building-step dimension (i.e., 7") below the floor 18" for passengers in the second row of seats 32. This step structure 64 is also at least a standard step-dimension wide, and in plan view with the cabin 18 in the loading and unloading position, the outside edge of this step structure 64 slightly overhangs the edge 62' of the platform 62. This step structure 64 in the loading and unloading position of the cabin 18 is also a standard step-dimension (i.e., 7") above this platform 62. Consequently, passengers loading onto or unloading from the cabin 18 in the first row of seats take one step up or down between the cabin 18 and the platform 62. These front-row passengers simply walk between their floor 18" and the step structure 64, which are at the same level. Passengers for the second row of seats 32 take two steps up or down (i.e., one step between platform 62 and step structure 64, and another step between step structure 64 and floor 18" for the second row of seats).

Further, as an added safety precaution, dependent from each portion 64' and 64" of the step structure 64 is one of a respective pair of kicker rods 66 (only one of which is visible in the Figures). These kicker rods 66 at their lower ends carry a spherical low-friction contact ball 68. These contact balls 68 are made of a material having good wear properties and a comparatively low coefficient of friction. For example, the Applicant believes that the contact balls 68 can be made of Dupont Delrin or equivalent material. With the cabin 18 in its loading and unloading position as seen in FIG. 3, the balls 68 just touch the surface 63. Thus, the kicker rods 66 and contact balls 68 assist in supporting the cantilevered step structure 64 in the loading and unloading position of the cabin 18. The passengers moving between the platform 62 and cabin 18 via this step structure 64 accordingly have more of an impression of solidarity and stability for the cabin 18, and enjoy greater certainty of their footing in their movement between the cabin 18 and platform 62.

Now, suppose the motion base mechanism experienced a mechanical failure resulting in loss of mechanical integrity for one or more of the actuators 26 or for the cabin 18. The occurrence of this event might result from, for example, a malfunction of the ride controller 30 which moves the passenger cabin 18 toward the platform 62 with sufficient velocity to perhaps spring or break one of the actuators 26 before the ride is shut down. Another situation which might cause such an occurrence is the breaking or disconnection of the pivotal mechanical connection between one end of an actuator 26 and the base 22 or cabin 18. Also, the base 22 might possibly come loose from the floor 24. Further, suppose at that time that a passenger seated in either row of seats and in the seat adjacent to the platform 62 had extended a foot outside of cabin 18 and beyond the outside edge of the step structure 64. If the mechanical failure of the actuators 28 or cabin 18 were such that the cabin moved outside of the maximum-mechanical-excursion envelope 38 toward the platform 62, then this foot could be caught between the cabin 18 and edge 62. The possibility for such an event is remote, but the consequences for the passenger whose foot was caught in the pinch between the cabin and platform could be severe.

If the above-hypothesized events were to occur, then one or both of the contact balls 68 will hit the chamfer surface 63 and kick the step portion 64' or 64" upwardly, as is depicted in dashed lines in the Figures. This upward kick of one or both of the step portions 64' and 64" will knock the errant passenger foot out of the pinch between the cabin 18 and edge 62, thus saving the passenger from injury. Although it is very unlikely that this event would ever occur, the slight possibility of a passenger injury occurring because of such an errant movement of the cabin 18 toward the platform 62 is greatly reduced or substantially eliminated by the mechanization of the step structure 64 as described.

After passenger unloading and reloading is completed, the controller 30 commands the actuators from their positions seen in FIGS. 4 and 5, back into their central-stroke positions. The cabin 18 thus moves away from the platform 62, and takes a selected position (ordinarily, but not necessarily, a centered position within the operating envelope 36 as depicted by solid lines in FIGS. 1 and 2) preparator to running another multi-media ride sequence.

FIG. 6 provides a fragmentary view partially in cross section (and at an increased size compared to the views of FIGS. 1–3), of an alternative embodiment of the invention. In order to obtain reference numerals for use in describing this alternative embodiment of the invention, features which are the same as, or equivalent in structure or function to, features described above are referenced with the same numeral used above, and having one-hundred (100) added thereto. Viewing FIG. 6, it is seen that passenger cabin 118 includes a cantilevered step structure 162 extending toward the platform 62. This step structure 164 includes at least one portion (indicated with reference numeral 164') which is hinged, and includes an actuating lever 70. Rather than using the kicker rods 66 and contact balls 68 as depicted and described with reference to the first embodiment of the invention to move the hinged step portion upwardly only in the event of an unwanted movement of the passenger cabin, the present embodiment includes an actuator 72 pivotally attached to the underside of the cabin 118 (i.e., as depicted in FIG. 6 on the underside of floor 118'), and having a piston rod 74 pivotally connecting to the actuating lever 70.

Consequently, in order to prevent a passenger adjacent to the platform in the first row of seats (or in both the first and second rows of seats) from extending a foot outside of and along the side of the cabin 118, during ride operation at least a front portion 164' of the step structure 164 (or the entire step structure 164) pivots upwardly to the dashed line position seen in FIG. 6. This dashed-line position for the step portion 164' presents a barrier to the feet of the passenger nearest to the platform in the front row of seats, and substantially prevents the possibility of this passenger extending a foot outside of the cabin 118 so as to catch a foot between the cabin 118 and the edge of the stationary passenger platform during ride operation even in the event of a movement of the cabin toward the platform after a loss of mechanical integrity for the actuators 26 or cabin 118.

For the passenger near the platform in the second row of seats, even if a foot is extended outwardly of the cabin 118 and onto step structure 164 during ride operation, this foot generally cannot be caught between the cabin 118 and the edge of the stationary passenger platform because of the greater elevation for the second row of seats. Even for a person with very long legs in the second row of seats who might be able to extend a foot beyond the far edge of step structure 164, this foot will not be in danger because the second row of seats is 7" higher than the first row, and the edge of the stationary passenger platform is another 7 inches below the step structure 164. However, if desired, this same concept of using a hinged portion of the step structure 164 (or the entire step structure) to pivot upwardly and form a barrier to passenger feet during ride operation can easily extend to second and subsequent rows of seats in a passenger cabin.

Alternatively, it will be understood that the step structure 164 may be made wide enough that in its dashed line position of FIG. 6, it is tall enough to present a barrier to the feet of passengers in the second or subsequent rows of seats. Also, it will be recognized that when the ride stops for passenger unloading and loading (either on schedule or as a result of the unlocking of a passenger restraint, and the restraint interlock explained above), then the step portion 164' returns to its solid line position seen in FIG. 6.

While the present invention has been depicted, described, and is defined by reference to particularly preferred embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

I claim:

1. A six-degree motion-base ride-simulator theater comprising:

a passenger cabin including at least one means for occupancy of this cabin by a human passenger, thus establishing a forward direction for said passenger cabin, and a portal at a side of said cabin for allowing ingress and egress of the passenger;

means for providing an audio-visual presentation to the passenger;

a six-degree movable motion base carrying said passenger cabin; said motion base including plural actuators providing motion to said passenger cabin; during ride simulation said motion base moving said passenger cabin within an operating envelope to provide G-forces to the passenger in concert with the audio-visual presentation; and mechanical motion stops associated with said plural actuators limiting motion of said actuators and cooperatively defining a maximum-mechanical-excursion envelope for motion of said cabin, which maximum-mechanical-excursion envelope is outside of said operating envelope;

a ride controller including means for driving selected ones of said actuators against said mechanical motion stops to position said cabin in a passenger loading/unloading position at one side of said maximum-mechanical excursion envelope; and a stationary passenger platform disposed at said one side of said cabin and outside of said operating envelope and immediately adjacent to but outside of said maximum-mechanical-excursion envelope, said stationary passenger platform being disposed immediately adjacent said passenger cabin in said loading/unloading position of the latter to allow passenger ingress and egress by passengers stepping directly between said passenger cabin and said stationary passenger platform.

2. The motion-base ride-simulator theater of claim 1 wherein said at least one means for occupancy of said passenger cabin this cabin by a human passenger includes a passenger seat carried in said cabin.

3. The motion-base ride-simulator theater of claim 2 wherein said passenger cabin includes a plurality of said passenger seats, said plurality of passenger seats being arranged in rows across said passenger cabin, and a plurality of passenger ingress and egress portals one aligned with each row of passenger seats, said stationary passenger platform being elongate and disposed at a side of said passenger cabin adjacent to said plural portals in said passenger loading/unloading position of said cabin.

4. The motion-base ride-simulator theater of claim 1 further including a passenger step carried by said passenger cabin.

5. The motion-base ride-simulator theater of claim 4 wherein said passenger step overhangs said stationary passenger platform in said passenger loading/unloading position of said passenger cabin.

6. A six-degree motion-base ride-simulator theater comprising:

a passenger cabin including at least one means for occupancy of this cabin by a human passenger, thus establishing a forward direction for said passenger cabin, and a portal at a side of said cabin for allowing ingress and egress of the passenger;

means for providing an audio-visual presentation to the passenger;

a six-degree movable motion base carrying said passenger cabin; said motion base including plural actuators providing motion to said passenger cabin; during ride simulation said motion base moving said passenger cabin within an operating envelope to provide G-forces to the passenger in concert with the audio-visual presentation; and mechanical motion stops associated with said plural actuators limiting motion of said actuators and cooperatively defining a maximum-mechanical-excursion envelope for motion of said cabin, which maximum-mechanical-excursion envelope is outside of said operating envelope;

a ride controller including means for driving selected ones of said actuators against said mechanical motion stops to position said cabin in a passenger loading/unloading position at one side of said maximum-mechanical excursion envelope; and a stationary passenger platform disposed at said side of said cabin and outside of said operating envelope, said stationary passenger platform being disposed adjacent said passenger cabin in said loading/unloading position of the latter to allow passenger ingress and egress;

wherein said stationary passenger platform is disposed closely adjacent to said maximum-mechanical-excursion envelope adjacent at said side of said cabin in said loading/unloading position of the latter.

7. The motion-base ride-simulator theater of claim 6 wherein said plural actuators include said mechanical motion stops therewithin.

8. The motion-base ride-simulator theater of claim 7 wherein said plural actuators are configured as elongate hydraulic cylinders, and said plural actuators also include a hydraulic cushion structure intervening between said mechanical motion stops therewithin and a central operating stroke portion of motion for said actuators.

9. A six-degree motion-base ride-simulator theater comprising:

a passenger cabin including at least one means for occupancy of this cabin by a human passenger, thus establishing a forward direction for said passenger cabin, and a portal at a side of said cabin for allowing ingress and egress of the passenger;

means for providing an audio-visual presentation to the passenger;

a six-degree movable motion base carrying said passenger cabin; said motion base including plural actuators providing motion to said passenger cabin; during ride simulation said motion base moving said passenger cabin within an operating envelope to provide G-forces to the passenger in concert with the audio-visual presentation; and mechanical motion stops associated with said plural actuators limiting motion of said actuators and cooperatively defining a maximum-mechanical-excursion envelope for motion of said cabin, which maximum-mechanical-excursion envelope is outside of said operating envelope;

a ride controller including means for driving selected ones of said actuators against said mechanical motion stops to position said cabin in a passenger loading/unloading position; and a stationary passenger platform disposed at said side of said cabin and outside of said operating envelope, said stationary passenger platform being disposed adjacent said passenger cabin in said loading/unloading position of the latter to allow passenger ingress and egress; and a passenger step carried by said passenger cabin;

wherein said passenger step includes a portion which is movable to dislodge a passenger foot extended beyond said step portion in the event of excessive motion of said passenger cabin toward said stationary passenger platform, and means for moving said passenger step portion in the event of excessive motion of said passenger cabin toward said stationary passenger platform.

10. The motion-base ride-simulator theater of claim 9 wherein said means for moving said passenger step portion in the event of excessive motion of said passenger cabin toward said stationary passenger platform includes a kicker rod dependent from said passenger step portion, and a chamfer surface adjacent to said stationary passenger platform and engaging said kicker rod to move said passenger step portion in the event of excessive movement of said passenger cabin toward said stationary passenger platform.

11. The motion-base ride-simulator theater of claim 9 wherein said passenger step includes at least a portion which is pivotally movable upwardly to a second position blocking a passenger foot from being extended outside of said passenger cabin, and means for moving said passenger step portion between a first position in which said step portion is available to be stepped upon by a passenger, and said second position.

12. The motion-base ride-simulator theater of claim 11 wherein said means for moving said passenger step portion includes an extensible actuator connected between said passenger cabin and said step portion.

13. A six-degree motion-base ride simulator comprising:

a movable passenger support structure including means for receiving and retaining on the ride simulator during operation at least one human passenger; said passenger support structure having a forward direction for said passenger and a side for allowing passenger ingress and egress from the ride simulator;

means for providing an audio-visual presentation to the passenger;

a six-degree movable motion base carrying said passenger support structure; said motion base including plural actuators providing motion to said passenger support structure; motions of said passenger support structure by said actuators during ride simulation defining an operating envelope to provide G-forces to the passenger in concert with the audio-visual presentation; and mechanical motion stops associated with said plural actuators to limit motion of said actuators and cooperatively define a maximum-mechanical-excursion envelope outside of said operating envelope for motion of said passenger support structure;

a stationary passenger platform disposed outside of said operating envelope and also outside of but closely adjacent to said maximum-mechanical-excursion envelope and adjacent to said side of said passenger support structure; said stationary passenger platform providing for passenger ingress and egress from said passenger support structure via said side of said support structure by passengers stepping directly between said stationary passenger platform and said passenger support structure; and a ride controller including means for driving selected ones of said actuators against said mechanical motion stops to position said side of said passenger support structure in a passenger loading/unloading position adjacent to said stationary passenger platform to allow passenger ingress and egress.

14. The motion-base ride simulator of claim 13 wherein said plural actuators are configured as elongate hydraulic cylinders including said mechanical motion stops therewithin; and said plural actuators also include a hydraulic cushion structure intervening between said mechanical motion stops therewithin and a central operating stroke portion of motion for said actuators.

15. The motion-base ride-simulator theater of claim 13 further including a passenger step carried by said passenger support structure.

16. A six-degree motion-base ride simulator comprising:

a passenger support structure including means for receiving and retaining on the ride simulator during operation at least one human passenger; said passenger support structure having a forward direction for said passenger and a side for allowing passenger ingress and egress from the ride simulator;

means for providing an audio-visual presentation to the passenger;

a six-degree movable motion base carrying said passenger support structure; said motion base including plural actuators providing motion to said passenger support structure; motions of said support structure by said actuators during ride simulation defining an operating envelope to provide G-forces to the passenger in concert with the audio-visual presentation; and mechanical motion stops associated with said plural actuators to limit motion of said actuators and cooperatively define a maximum-mechanical-excursion envelope outside of said operating envelope for motion of said passenger support structure;

a stationary passenger platform disposed outside of but closely adjacent to said operating envelope and adjacent to said side of said passenger support structure; said stationary passenger platform providing for passenger ingress and egress from said passenger support structure via said side of support structure;

a ride controller including means for driving selected ones of said actuators against said mechanical motion stops to position said side of said passenger support structure in a passenger loading/unloading position adjacent to said stationary passenger platform to allow passenger ingress and egress; and a passenger step carried by said passenger support structure;

wherein said passenger step includes a portion which is movable to dislodge a passenger foot extended beyond said step portion in the event of excessive motion of said passenger support structure toward said stationary passenger platform, and means for moving said passenger step portion in the event of excessive motion of said passenger support structure toward said stationary passenger platform.

17. The motion-base ride-simulator theater of claim 16 wherein said means for moving said passenger step portion in the event of excessive motion of said passenger support structure toward said stationary passenger platform includes a kicker rod dependent from said passenger step portion, and a chamfer surface adjacent to said stationary passenger platform and engaging said kicker rod to move said passenger step portion in the event of excessive movement of said passenger support structure toward said stationary passenger platform.

18. The motion-base ride-simulator theater of claim 16 wherein said passenger step includes at least a portion which is pivotally movable upwardly to a second position blocking a passenger foot from being extended outside of said passenger support structure, and means for moving said passenger step portion between a first position in which said step portion is available to be stepped upon by a passenger and said second position.

19. The motion-base ride-simulator theater of claim 18 wherein said means for moving said passenger step portion includes an extensible actuator connected between said passenger support structure and said step portion.

20. A method of providing for passenger loading and unloading from a passenger cabin of a six-degree motion-base ride simulator, said method including steps of:

providing a passenger cabin including means for receiving and allowing occupancy of said cabin by at least one passenger and establishing a forward direction for said passenger cabin;

providing a portal at a side of said passenger cabin for allowing passenger ingress and egress;

providing a six-degree movable motion base carrying said passenger cabin; including in said motion base plural actuators providing motion to said passenger cabin;

using said actuators to move said passenger cabin within an operating envelope to provide G-forces to the passenger; and providing said plural actuators with mechanical motion stops limiting motion of said actuators to cooperatively define outside of said operating envelope a maximum-mechanical-excursion envelope for motion of said passenger cabin;

providing a stationary passenger platform disposed outside of said operating envelope at said side of said passenger cabin; thereby providing for passenger ingress and egress from said ride simulator via said stationary passenger platform;

driving selected ones of said plural actuators against said mechanical motion stops to position said passenger cabin in a passenger loading/unloading position at a selected position relative to said maximum excursion envelope toward said side of said passenger cabin and adjacent to said stationary passenger platform; and allowing passenger ingress and egress between said passenger cabin and said stationary passenger platform while said passenger cabin is in said loading/unloading position.

21. The method of claim 20 further including the steps of providing a passenger step carried by said passenger cabin, causing said passenger step to be adjacent to said stationary passenger platform in said passenger loading/unloading position of said passenger cabin, and allowing passengers to step between said stationary passenger platform and said passenger cabin via said passenger step in said loading/unloading position of said passenger cabin.

22. A method of providing for passenger loading and unloading from a passenger cabin of a six-degree motion-base ride simulator, said method including steps of:

providing a passenger cabin including means for receiving and allowing occupancy of said cabin by at least one passenger and establishing a forward direction for said passenger cabin;

providing a portal at a side of said passenger cabin for allowing passenger ingress and egress;

providing a six-degree movable motion base carrying said passenger cabin; including in said motion base plural actuators providing motion to said passenger cabin;

using said actuators to move said passenger cabin within an operating envelope to provide G-forces to the passenger; and providing said plural actuators with mechanical motion stops limiting motion of said actuators to cooperatively define outside of said operating envelope a maximum-mechanical-excursion envelope for motion of said passenger cabin;

providing a stationary passenger platform disposed outside of said operating envelope at said side of said passenger cabin; thereby providing for passenger ingress and egress from said ride simulator via said stationary passenger platform;

driving selected ones of said plural actuators against said mechanical motion stops to position said passenger cabin in a passenger loading/unloading position at a selected position relative to said maximum excursion envelope toward said side of said passenger cabin and adjacent to said stationary passenger platform;

allowing passenger ingress and egress between said passenger cabin and said stationary passenger platform while said passenger cabin is in said loading/unloading position;

providing a passenger step carried by said passenger cabin, causing said passenger step to be adjacent to said stationary passenger platform in said passenger loading/unloading position of said passenger cabin, and allowing passengers to step between said stationary passenger platform and said passenger cabin via said passenger step in said loading/unloading position of said passenger cabin; and providing at least a portion of said passenger step which in the event of excessive motion of said passenger cabin toward said stationary passenger platform is movable to dislodge a passenger foot extended outwardly of said cabin and on or beyond said step portion, and moving said step portion to dislodge any passenger foot which is so positioned on said step portion, thereby saving said passenger from having the foot pinched between the passenger cabin and the stationary passenger platform.

23. The method of claim 22 wherein said step of moving said step portion includes the steps of including a kicker rod dependent from said passenger step portion, and providing a surface adjacent to said stationary passenger platform and engaging said kicker rod to move said passenger step portion in the event of excessive movement of said passenger cabin toward said stationary passenger platform.

24. The method of claim 22 further including the steps of providing at least a portion of said passenger step which is movable from a first position in which said portion is available to be stepped upon by a passenger upwardly to a second position in which said step portion obstructs movement of a passenger foot outwardly of said passenger cabin, and moving said step portion to said second position during operation of said motion-base ride simulator to inhibit a passenger from placing a foot outside of said cabin.

* * * * *